United States Patent
Steinich et al.

(10) Patent No.: US 9,062,988 B2
(45) Date of Patent: Jun. 23, 2015

(54) PIN-SHAPED MAGNETIC ANGLE SENSOR

(75) Inventors: Klaus Manfred Steinich, Zorneding (DE); Peter Wirth, Eching (DE)

(73) Assignee: ASM Automation Sensorik Messtechnik GmbH, Moosinning (DE)

( * ) Notice: Subject to any disclaimer, the term of this patent is extended or adjusted under 35 U.S.C. 154(b) by 1196 days.

(21) Appl. No.: 12/006,944

(22) Filed: Jan. 8, 2008

(65) Prior Publication Data

US 2008/0164867 A1    Jul. 10, 2008

(30) Foreign Application Priority Data

Jan. 8, 2007  (DE) .......................... 10 2007 001 268
Apr. 20, 2007  (DE) .......................... 10 2007 018 758

(51) Int. Cl.
G01B 7/30    (2006.01)
G01D 5/14    (2006.01)
G01D 11/24   (2006.01)

(52) U.S. Cl.
CPC .............. G01D 5/145 (2013.01); G01D 11/245 (2013.01)

(58) Field of Classification Search
USPC .................................. 324/174, 207.2–207.25
See application file for complete search history.

(56) References Cited

U.S. PATENT DOCUMENTS

| | | | |
|---|---|---|---|
| 3,732,494 A * | 5/1973 | Dragon | 324/173 |
| 4,646,011 A | 2/1987 | Wallrafen | |
| 5,631,557 A * | 5/1997 | Davidson | 324/174 |
| 5,939,878 A | 8/1999 | Dong | |
| 7,391,203 B2 | 6/2008 | Modest | |
| 7,855,552 B2 * | 12/2010 | Steinich | 324/207.25 |
| 7,965,075 B2 * | 6/2011 | Mueller et al. | 324/207.25 |
| 2003/0085698 A1 * | 5/2003 | Sakanoue | 324/207.2 |
| 2003/0085699 A1 * | 5/2003 | Sakanoue | 324/207.2 |
| 2003/0155909 A1 * | 8/2003 | Steinruecken et al. | 324/207.2 |
| 2004/0080314 A1 * | 4/2004 | Tsujii et al. | 324/207.21 |
| 2006/0017433 A1 * | 1/2006 | Hattori | 324/207.25 |
| 2006/0244439 A1 * | 11/2006 | Fukuoka et al. | 324/207.2 |
| 2007/0057665 A1 * | 3/2007 | Borst et al. | 324/207.2 |
| 2007/0290679 A1 * | 12/2007 | Okui et al. | 324/207.25 |
| 2008/0265876 A1 * | 10/2008 | Lee et al. | 324/207.21 |
| 2009/0091315 A1 * | 4/2009 | Aoki | 324/207.25 |

FOREIGN PATENT DOCUMENTS

| | | | |
|---|---|---|---|
| DE | 2643286 | 9/1976 | |
| DE | 19956313 | 11/1999 | |
| DE | 69814387 T2 | 4/2004 | |
| DE | 10345049 | 2/2005 | |
| JP | 2001-174208 | 6/2001 | |
| WO | 2007/131372 | 11/2007 | G01D 11/24 |

* cited by examiner

*Primary Examiner* — Jay Patidar (74) *Attorney, Agent, or Firm* — Head, Johnson & Kachigian, P.C.

(57) ABSTRACT

To provide a thin and slender magnetic angle sensor, a main circuit board is disposed in the direction of the longitudinal axis of the sensor. This sensor element in form of a chip is supported on a sensor circuit board, which is positioned transversely to the main circuit board at the forward narrow side of the main circuit board.

10 Claims, 13 Drawing Sheets

PIN-SHAPED MAGNETIC ANGLE SENSOR

CROSS-REFERENCE TO RELATED APPLICATIONS

This United States patent application claims priority to German Patent Application No. 102007018758.2 filed 20 Apr. 2007 and German Application No. 102007001268.5 filed 8 Jan. 2007.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The invention relates to a magnetic angle sensor, as it is used in the state of the art as an alternative to potentiometers or other angle sensor principles.

In such magnetic angle sensors, rotational angle transfer between the encoder element, which is a magnet in this application and the sensor element, which is provided as an electronic chip (IC), is exclusively performed by means of magnetic field lines, and above all without a mechanical coupling, so that the sensor element is completely encapsulated mechanically and stored in a separate cavity, when the magnetic field can reach the sensor element in this cavity.

2. Background Art

In conjunction with such sensor units, Hall-effect sensor elements are used or angle sensors operating according to the magneto-resistive principle.

Definitions: The Terms Primarily Used in the Claims are Defined as Follows:

The angle sensor 1 is the component including the particular sensor element 4, provided as a chip 7 in both applications.

The magnet unit 50 is the assembly mostly disposed opposite to the angle sensor 1, and which includes the encoder magnet 50a, b, which is configured to influence the angle sensor 1.

The sensor unit 100 is comprised of the angle sensor and the magnet unit 50.

The basic configuration and also the particular dimension, in particular of the angle sensor of such sensor unit are typically determined by the application within certain ranges, wherein it occurs quite frequently that the available installation space permits a rather large axial length of the angle sensor but only a relatively small radial extension so that often a slender pin-shaped angle sensor is required.

Typical applications are the use as a hinge sensor in order to detect the rotation position of a hinge at a hinge, and thus the rotational position of the door or flap suspended thereon, or also industrial applications where measurements are performed over more than one turn (multi-turn) applications.

Due to the contrary, the magnetic angle sensors commercially available so far are not optimized for a specific dimension (diameter or length), but they are mostly provided block shaped with dimensions which are about the same in all spatial directions

BRIEF SUMMARY OF THE INVENTION

Thus, it is the object of the present invention to provide an angle sensor and a sensor unit, formed therewith, which is optimized in size with respect to a specific exterior configuration (pin shape), and furthermore allows an application which is independent from interfering magnetic fields being present in the area of application.

The use under the influence of interfering magnetic fields is facilitated by a magnetically conductive shielding around the sensor unit, which is e.g. comprised of ferromagnetic material. The shielding shall be embodied so that it is as tight as possible against the penetration of interfering fields into the inner cavity of the shielding, so that only the use field generated by the encoder magnet impacts the sensor element. Additionally, the shielding is to serve as a flux conductor component due to its magnetic conductivity and shall, on the one hand, cause a coordinated guidance of the use field of the encoder magnet and optimize its flux pattern, and, on the other hand, guide the inevitable scatter portion of this use field into this shielding in a targeted manner.

For this purpose the shielding, on the one hand, comprises a sensor shielding, comprising at least the long sides of the housing of the sensor element, at least in the longitudinal portion, in which the sensor element is disposed, preferably also the reverse side of the sensor element facing away from the encoder element, while the forward face surface, pointing towards the encoder magnet must not be shielded in order not to impede the penetration of the use field.

The shielding, furthermore, comprises preferably an encoder shielding, shielding the encoder magnet on the longitudinal sides and on the backside facing away from the sensor element.

When the magneto axis of the encoder magnet is thus disposed transversal to the longitudinal axis, this means parallel to the bottom surface of a pot-shaped encoder shielding, an offset from non-magnetizable material between the encoder magnet and the encoder shielding shall be provided, which has to be the larger, the larger the offset between the encoder magnet and the sensor element is configured.

Preferably, the sensor shielding and the encoder shielding are thus respectively pot shaped, or dish shaped, preferably provided respectively in one piece, and reach with their open sides so close towards each other, or overlap in axial direction, and reach into each other axially with a radial distance so small, so that the penetration of an interfering field into the interior of the shielding is mostly avoided.

Thus, preferably, the sensor shielding and the sensor element are fixed in place, while the encoder shielding can be rotated together with the rotating encoder magnet.

In a preferred embodiment, the sensor unit only comprises an encoder shielding as a magnetic shielding, which also rotates with the encoder magnet, which, however, extends in axial direction towards the sensor element and beyond it, so that no undesirable interference fields can reach the sensor element, wherein the co-rotating sensor shielding is provided pot shaped in particular. This has the advantage that a possibly present residual magnetization of the magnetic shielding does not negatively influence the signal obtained, since it co-rotates with the encoder magnet in its alignment.

Thereby, less expensive materials can be used for the encoder shielding.

Preferably, the sensor element is thus not disposed close to the front edge, thus the open side of the shielding, but moved backward in longitudinal direction into the interior of the shielding and thus of the housing, wherein the rearward movement comprises at least 50%, better 60% of the free inner diameter of the housing, or of the sensor shielding at its front end. Only this way, the penetration of interfering fields up to the sensor element, even when no encoder shielding is present, can be greatly reduced.

In order to allow an engagement of the use field into the sensor element, regardless of the current position of encoder relative to the sensor element, the shielding is provided rotationally symmetrical to the longitudinal axis of the angle sensor. This is advantageous in particular for multi-turn applications since hereby the encoder magnet does not only change its angular position relative to the sensor element but also its axial distance, since it is disposed on the face surface of a thread, wherein the processing also of the magnet distance has to be performed with high resolution, which is hardly possible with sufficient precision under the influence of interfering fields.

A sufficient shielding allows the use of angle sensors at locations where very strong interfering fields are present, such as on the shaft stub of an electric motor where magnetic angle sensors without shielding have never been used so far.

The material of the shielding thus has a sufficiently high permeability of $\mu \gg 100$, in particular >5,000, in particular >50,000 in order to facilitate the magnetic flux of the use field but to keep away interfering fields.

When the shielding has to be disposed very close to the sensor element, a shielding material with a small coercive field strength (Hc) or remanency (Br) has to be selected, since otherwise residual fields can remain in the shielding material, influencing the sensor precision.

At a distance of less than 10 mm to the sensor element, a magnetic material with Hc<10 A/cm, better <1 A/cm, better 0.1 A/cm has to be selected.

With respect to its construction, the magnetic shielding can be a separate component which is injection molded, e.g. from plastic bonded ferrite, or sintered from hard ferrite, or which is comprised of nanocrystalline iron. The shielding, however, can also be an integral component of the housing itself, since the housing is comprised of a respective material. In case of a pin-shaped sensor element, this will preferably be a sleeve-shaped cylindrical housing with a preferably closed bottom.

In order to achieve a slender pin-shaped embodiment of the angle sensor of the sensor unit, the angle sensor comprises a long and slender, e.g. sleeve-shaped housing, closing at least the longitudinal sides mechanically tight, thereby protecting the sensor in its interior, and also the rear face surface of the housing is sealed tight.

In this housing, the sensor element is provided parallel to the open forward face surface of the housing, thus transversal to the longitudinal axis of the sensor element, while the main circuit board with the processing electronics is disposed extending in longitudinal direction of the housing, and thus transversal to the surface of the sensor element in the housing. For this purpose, the sensor element is mounted to the frontal narrow side of the main circuit board preferably mounted on a separate sensor circuit board which is transversal to the main circuit board. The sensor element is typically provided as a chip (IC).

The main circuit board and/or the sensor circuit board are thus comprised of a material that is stable by itself, and also forms a stable unit when they are connected so that this unit only requires an axial and radial support by means of the interior surface of the housing. This is accomplished by preferably directly mounting a pilot plug on the rear end of the main circuit board, closing tight the rear face surface of the e.g. sleeve shaped housing, and which can be inserted into the housing from its rear side, if it is a sleeve-shaped housing which is open on both sides.

This pilot plug is preferably the connector socket itself through which the signals of the sensor are transmitted to the outside by means of cables, and the connector socket, or the pilot plug is directly mounted to the rear end of the main circuit board, preferably, by means of soldered connection elements.

Since the connection pins protruding from the reverse side of the connector socket have a defined offset relative to the main circuit board, also disposed in the housing in a defined manner, this offset has to be bridged electrically. Typically, the pilot plug or the connector socket will have an expanded shoulder for placement on the rear face surface of the housing, and/or a radially extending groove for inserting an O-ring.

In order to be able to perform this not only manually but automatically, more economical electronic components are placed as electrically conductive spacers on the main circuit board at these soldered connection points, having the correct height, and which are available for this purpose in different heights, like e.g. chip capacitors or chip resistors, specially manufactured metal spacers can also be used if necessary.

At the front end, the sensor circuit board is provided with an outer contour, whose diameter matches the inner contour of the housing as closely as possible, so that a radial movement, e.g. of the rectangular sensor circuit board is not possible in the housing.

The housing can have a reduced inner cross section at the front end, wherein the axial length of the reduced inner cross section corresponds to the rearward offset of the sensor element, and thus the sensor circuit board contacts on the inside between the reduced and the non-reduced inner cross section. The inner cross section of the housing is preferably round.

The outer cross section of the housing comprises mounting devices for mounting to a surrounding component, in particular an exterior thread, so that the housing preferably also comprises a round outer circumference.

The outer circumference can additionally be provided non-circular over a certain length section, and can preferably comprise tool contact surfaces which extend in parallel to each other. A longitudinal portion of the outer diameter can also be provided circular, however, with a diameter which is smaller than the core diameter of the exterior thread in the other longitudinal portions.

The housing can furthermore comprise a zero position marker on the outside at one position of the circumference, in particular provided as a zero position groove, which extends in longitudinal direction, whereby the zero position of the sensor element is characterized. By the same token, the outside of the housing can have a multi-tooth profile instead of the exterior thread, in order to be able to insert the housing of the angle sensor in defined angular position into a respective multi-tooth inner profile.

In case an outer thread is present, this outer thread preferably serves a double purpose. Thus, on the one hand, in the rear portion for placing and threading an appropriate plug with a sleeve nut onto the connector socket, and in the remaining portion for mounting the angle sensor by means of two nuts which can be threaded onto the exterior thread to a component in the vicinity.

The forward face surface of the housing of the angle sensor is also closed mechanically in order to protect the sensor element from detrimental effects. This closure can also be effected by means of a separate front cover which is placed tight onto the front rim of the housing.

If the front cover is made from metal, however, not from ferromagnetic material, like e.g. brass, or aluminum, welding onto the housing is preferred, in particular by means of a laser. If the front cover is made from plastic, it is glued on, in particular pressed onto the encasement compound which is still soft, which is also made of plastic, and by which the interior of the housing is cast. Thus, the plastic front cover can be comprised in particular of translucent plastic so that an optical indicator like in the interior, like a LED, becomes visible on the main circuit board or on the sensor circuit board.

For the front cover a shoulder can also be provided in the interior cross section of the housing between a reduced and a non-reduced cross section, where the front cover contacts.

It has proven advantageous in particular that the encoder shielding 101a, in particular in the form of such a front cover, which can also be provided integral with the remaining housing, is produced from a ferromagnetic material, if said cover at least in the center, symmetrical to the longitudinal axis, on which the sensor element is disposed, comprises a portion in which the wall thickness is so small that the field strength of the opposite encoder magnet is sufficient in order to not only magnetically saturate this thin wall made of ferromagnetic material but to let the magnetic field lines penetrate through this portion into the interior of the angle sensor up to the sensor element.

This has the advantage that the field lines are inducted through the portion with the small field strength, precisely concentric to this portion, also when the outer encoder magnet is offset eccentrically, tilted with its longitudinal axis, and comprises other imprecise alignment features with reference to the longitudinal axis of the angle sensor.

Furthermore, there is another possibility to improve the measurement result of the angle sensor if the encoder magnet is not positioned exactly concentric to the longitudinal axis of the angle sensor but tilted or radially offset.

When an intermediary unit is disposed between the angle sensor and the magnet unit, it has a centering effect again.

For this purpose, an encoder magnet is supported rotatable around the longitudinal axis, wherein the pole axis of the intermediary magnet is preferably disposed transversal to the longitudinal axis, and thus the rotation axis of the intermediary magnet.

In a preferred embodiment, this intermediary magnet is supported in the intermediary unit by means of a ferro fluid which yields particularly small friction forces of the support.

The housing of the intermediary unit can be a simple disk, e.g. from plastic, which can either be disposed in the interior of the housing of the magnet unit, in particular inserted.

The pilot plug, or the connector socket, can also be comprised of translucent plastic at the rear end so that LED indicators can shine through the connector.

Another possibility to effect closure is to simply fill the interior of the housing with encasement material up to the frontal surface so that the encasement material itself constitutes the front cover. In particular in this case, a two-layer encasement is performed by initially encasing with an elastomeric, in particular silicone gel or polyurethane resin, until the electrical components are completely encased therewith.

Only the residual cavity is then encased with an outer layer made of hard material, e.g. epoxy resin, which builds up stress during hardening, which can damage the electrical components if they are directly encased.

By the same token, the entire encasement can be performed in one layer with a not completely hardening encasement material, thus an elastomer like polyurethane.

Preferably, the sensor unit can also be provided with two sensor elements galvanically separated from each other in order to achieve redundancy. Both sensor elements can even be housed on the same IC. Preferably, then also two separate and galvanically separated wire ports can be provided at the sensor unit.

The processing electronics of the sensor unit can preferably still be programmed in completely finished and entirely encased state, either by means of at least one additionally electric conductor in the cable, or wirelessly by means of radio signals, optical signals, or magnetic signals.

By means of this assembly, the sensor can be mounted in a particularly quick and simple manner, wherein:
  initially, on the one hand, the main circuit board, and on the other hand, the sensor circuit board is stuffed with the respective components;
  then, both circuit boards are directly soldered together by means of several angled pins, which have already been soldered to one of the circuit boards previously; and
  at the back end of the main circuit board a round plug is soldered to the face surface of the main circuit board; and
  the entire functional unit is inserted from the face surface, preferably from the rear face surface, and subsequently encased in the interior of the housing.

Subsequently, a front cover can be placed onto the face surface. Alternatively, the encasement can also be performed after closing the front face of the housing through an opening in the plug element, or in the rear pilot plug.

BRIEF DESCRIPTION OF THE DRAWINGS

Embodiments according to the invention are subsequently described in more detail. It is shown in:

FIG.1d is a top view of the sensor shown in FIG. 1a;

DETAILED DESCRIPTION OF THE INVENTION

Figure 1A:
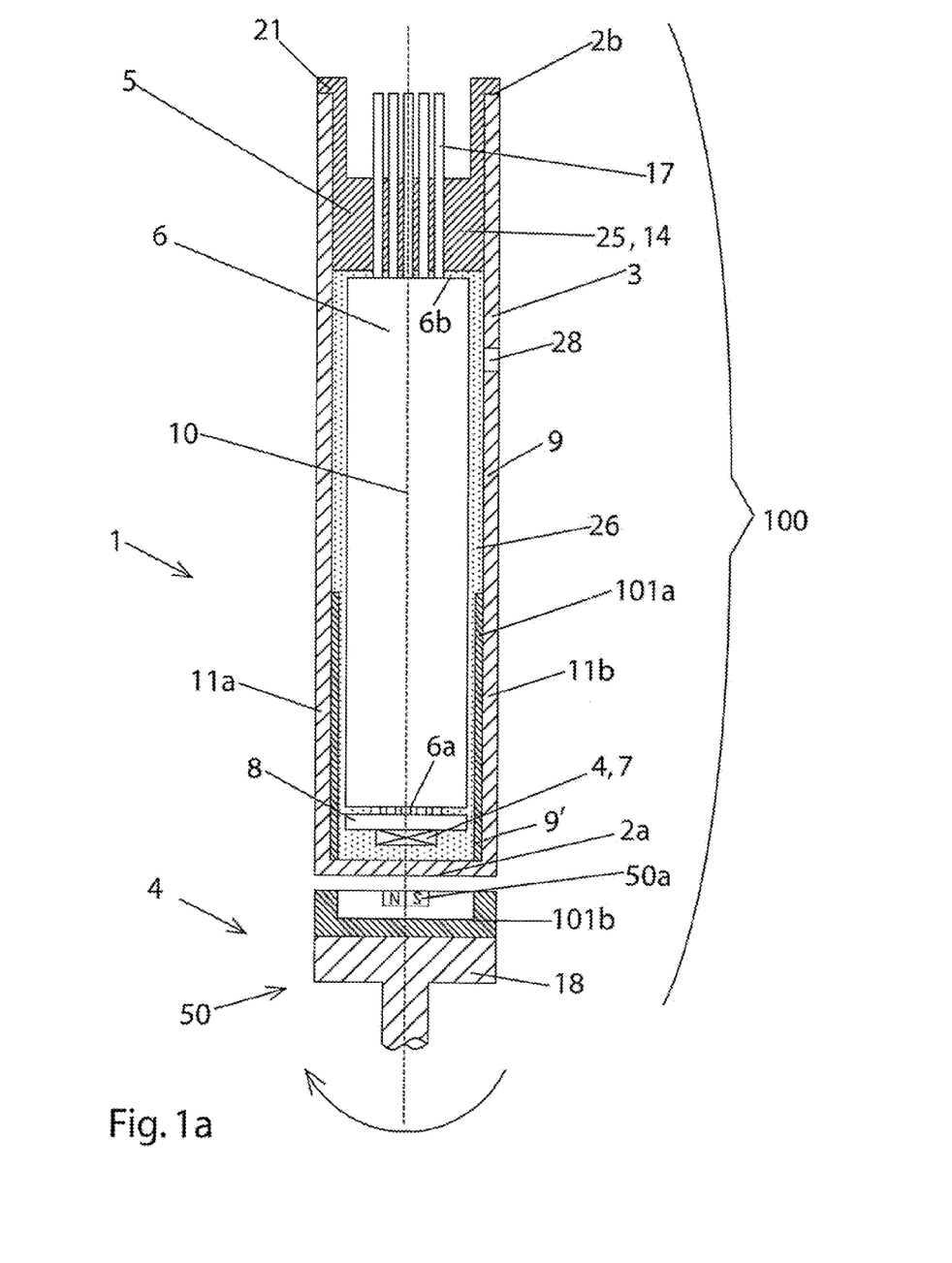
FIG. 1a illustrates a cross-sectional view of a sensor having a closed forward face.

FIG. 1a shows the sensor unit 100 in cross section comprised of an angle sensor 1 and a magnet unit 50 which is disposed opposite to a forward face surface of the angle sensor so that it can rotate around a longitudinal axis 10, which it shares with the angle sensor 1, while the angle sensor 1 is fixed.

The encoder magnet 50a, which is disposed in the magnet unit 50, generates a magnetic field extending into the portion of the sensor element 4, extending therein coplanar to the plane of the sensor element 4, so that a rotation of the encoder magnet 50a, and thus its field lines, extending coplanar with the sensor element 4 are detected by the sensor element 4, which is provided in the form of a chip 7 in this case, and converted into processable electrical signals by means of the processing electronics.

The encoder magnet 50a is thus housed in the open side of a pot-shaped encoder shielding 101b, which, in turn, is disposed torque proof with its closed rear side on an encoder core body 18 which is mounted torque proof to a component (not illustrated) whose rotation position shall be detected, as shown in FIG. 4.

The encoder magnet 50a does not axially protrude beyond the face rim of the shielding 101b but ends flush in axial direction with the shielding.

The encoder magnet 50a is diametrically magnetized with reference to the transversal axis and preferably only has one south pole and one north pole, and is disposed in the center, thus with the boundary between the poles on the longitudinal axis 10.

The magnet unit 50 is closely adjacent and opposed with its forward face side to the forward face surface 2a of the housing 3 of the angle sensor 1 but does not touch. The distance is selected so that in spite of the alignment of the longitudinal axis of the angle sensor 1 and the magnet unit 50, which is not always 100% perfect, the two components barely do not touch when they rotate relative to each other.

The housing 3 of the angle sensor 1 is provided pot shaped, wherein the bottom of the pot forms the face surface 2a, which is located opposite to the encoder, and the longitudinal sides 11a, b of the preferably cylindrical housing extend from this face surface over an axial length, which is a multiple of the diameter of the face surface, so that the housing 3 is long and slender.

The rear face surface 2b of the housing 3 is open and from there the functional components of the angle sensor 1 are inserted into the housing 3, which is closed besides the rear face surface, and a small lateral bleed opening 28, which may be required.

The functional components are comprised of a main circuit board 6, extending in longitudinal direction 10 of the housing 3, at whose rear edge 6b a pilot plug 14 in the nature of a connector socket 5 is soldered on through which the plug pins 17 extend outward, and which fits into the inner circumference at the rear end of the housing 3 by a shoulder 21 of the connector socket 5 contacting the rear face surface of the pot-shaped housing 3, when the functional components are fully inserted into the housing 3.

At the frontal short or narrow side 6a of the main circuit board 6, a sensor circuit board 8 is mounted by means of a plurality of angled pins, located next to each other. The sensor circuit board extends perpendicular to the main circuit board in a transversal direction in front of the narrow side 6a of the main circuit board, mostly filling the inner cross section of the housing 3, and on whose face surface, facing away from the main circuit board 6, the sensor element 4 is soldered on in the form of a chip 7, and connected to the processing electronics (not illustrated) on the main circuit board 6, whose reconfigured signals can then be read out through the contact pins 11 of the connector socket 5.

The shielding 101a of the angle sensor is comprised of a socket which fits into the inner diameter of the housing 3 and inserted in forward direction into the front portion of the housing up to the stop at the bottom of the housing.

Since the sensor element 4 is positioned slightly offset to the bottom, when the connector socket 5 is completely inserted into the housing 3, until its shoulder 21 contacts at its rear face surface, the shielding 101 protrudes forward, slightly beyond the sensor element 4, whereby already the penetration of interfering magnetic field towards the sensor element 4 is made much more difficult, since they can only penetrate through the small axial gap between the sensor shielding 101 and the encoder shielding 101b.

Preferably, in this embodiment and in all other embodiments the interior of the angle sensor 1 is filled with encasement material and/or the encoder magnet 50a is mounted therewith in the pot-shaped shielding 101b.

Figure 1B:
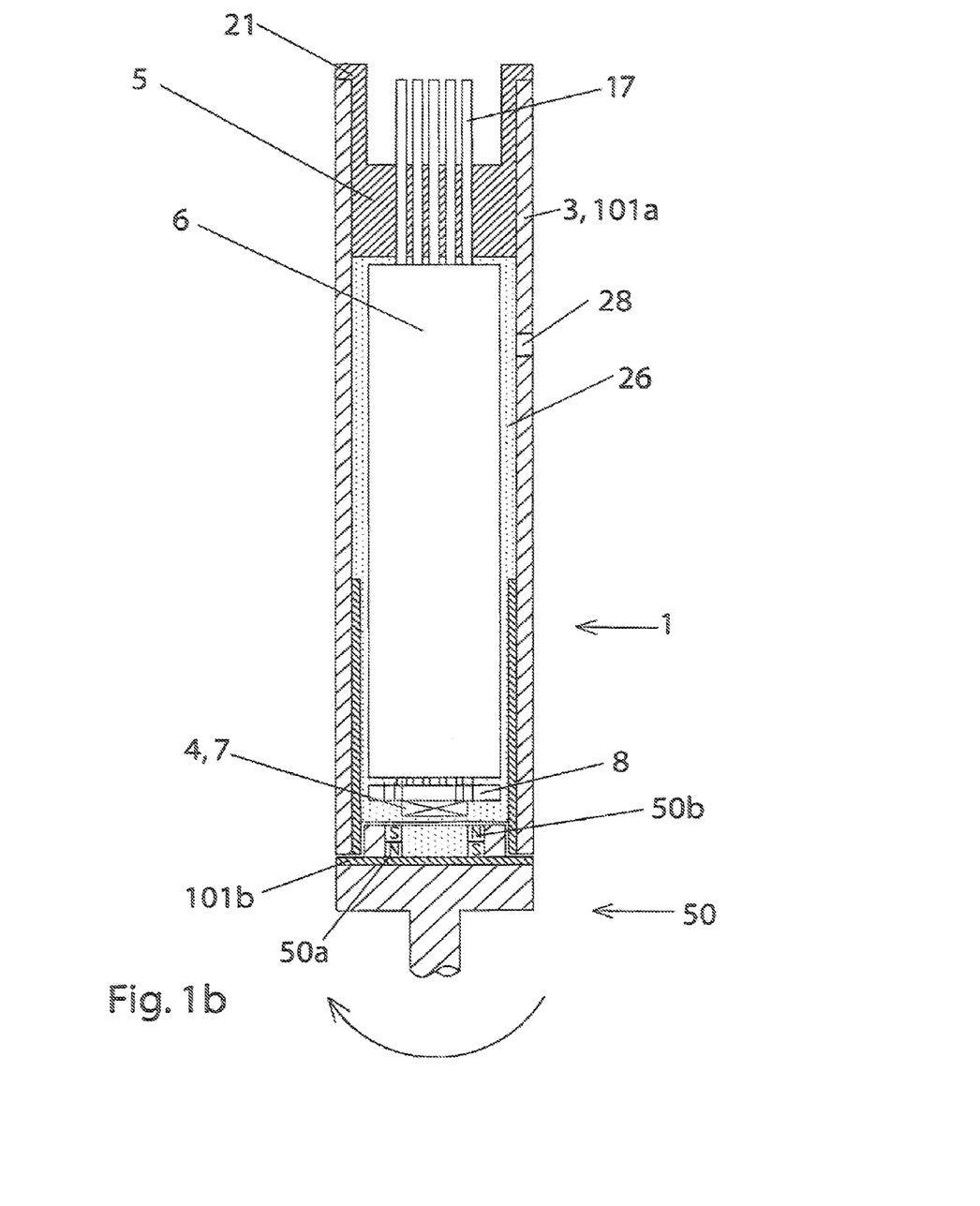
FIG. 1b illustrates the sensor in FIG. 1a with an opened front face.

The sensor unit 100 of FIG. 1b differs from the one of FIG. 1a primarily by the face surface of the housing 3 not being closed by a bottom, but open, and furthermore the sensor element being a little bit more offset from the free front face surface 2a of the housing.

Due to the shoulder 21, which is also present at the rear end of the connector socket 5, also the functional unit is inserted from the rear face surface into the sleeve shaped housing 3. In case an encasement of the interior of the housing is desired, this can be performed in case of the housing of FIG. 1a, which is closed at its face surface, only through the lateral opening 28, which simultaneously serves as a bleed opening, while this is possible from the open forward face surface 2a in the solution according to FIG. 1b, while the opening 28 only serves for bleeding.

The hardening of the encasement material 24 is thus performed with the housing placed vertical with the forward face surface 2a pointing upward, wherein the encasement material reaches upward far enough so that the sensor element 4, provided as a chip 7, is still covered by the encasement material. The remaining overhang of the housing 3 and also of the shielding 101a of the sensor is used in order to let the encoder 51 protrude into the open face surface of the housing 3, without the angle sensor 1 and the encoder 51 touching each other.

Thus, on the one hand, the encoder magnets 50a, b, two of which are disposed in the magnet unit 50, move closer to the sensor element 4 than in the solution, according to FIG. 1a and, on the other hand, the gap between the two shieldings 101a and 101b becomes significantly smaller.

While the shielding 101a reaches to the front rim of the side walls of the housing 3, the magnets 50a, b of the magnet unit 50 are located on a plate as a shielding 101b contacting the core body 18, extending transversal to the side walls, wherein the shielding extends beyond the sleeve shaped shielding 101a in outward direction at a very small axial distance. Two magnets 50a, b with a pole direction parallel to the longitudinal axis 10 are provided here as encoder magnets, which are disposed diametrically opposed relative to the longitudinal axis so that one of them points towards the sensor element 4 with its south pole and the other one points to it with its north pole.

Figure 1C:
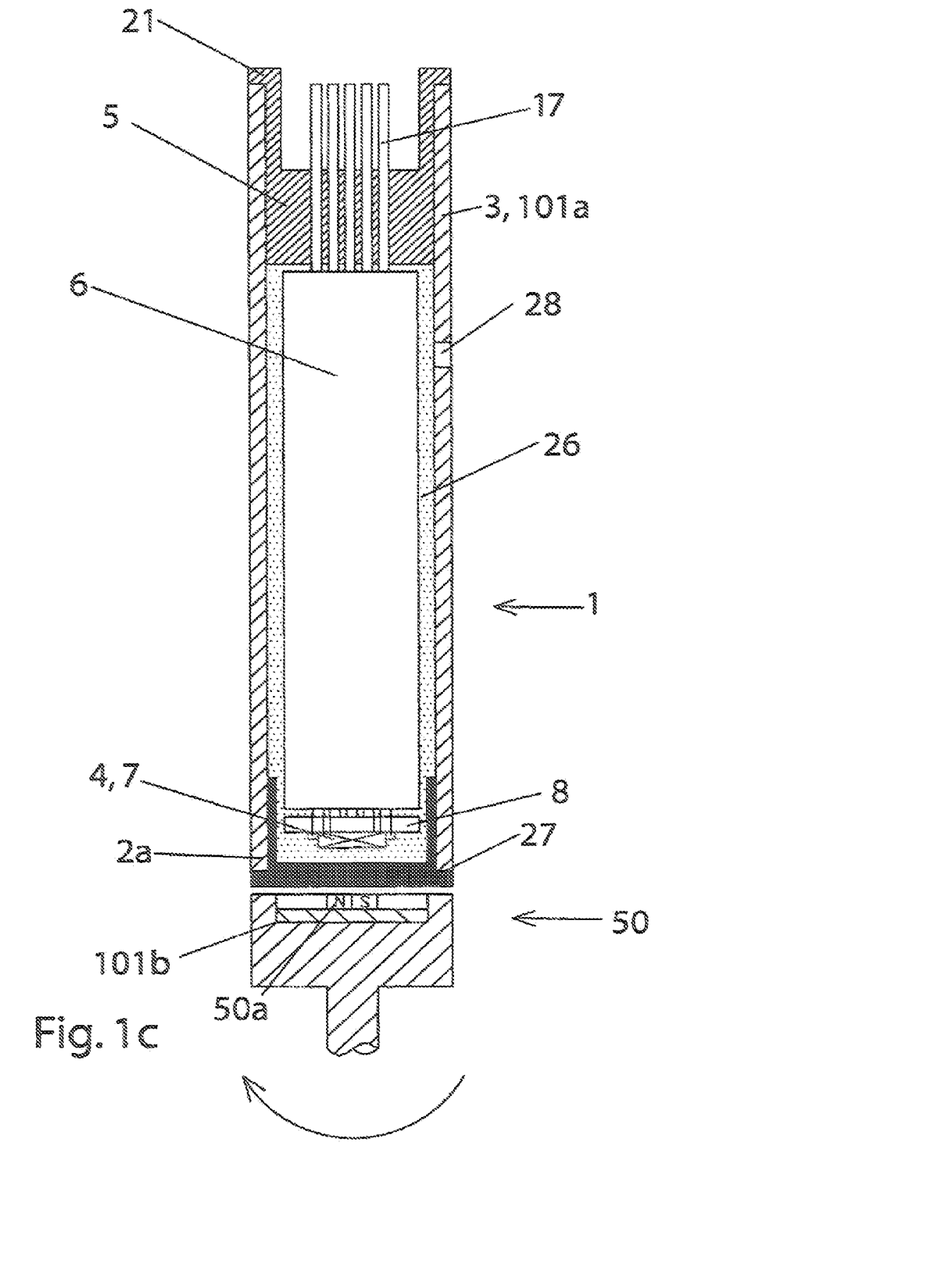
FIG. 1c,e illustrate a sensor constructed in accordance with the present invention having an opened front face with post-shaped shielding enclosing the front face.
Figure 1D:
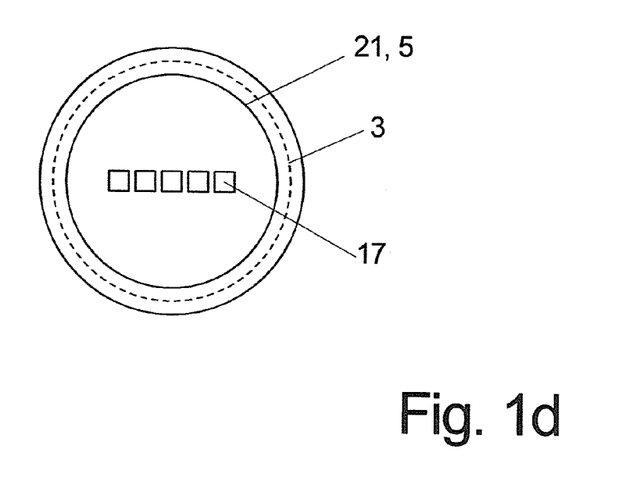
Figure 1E:
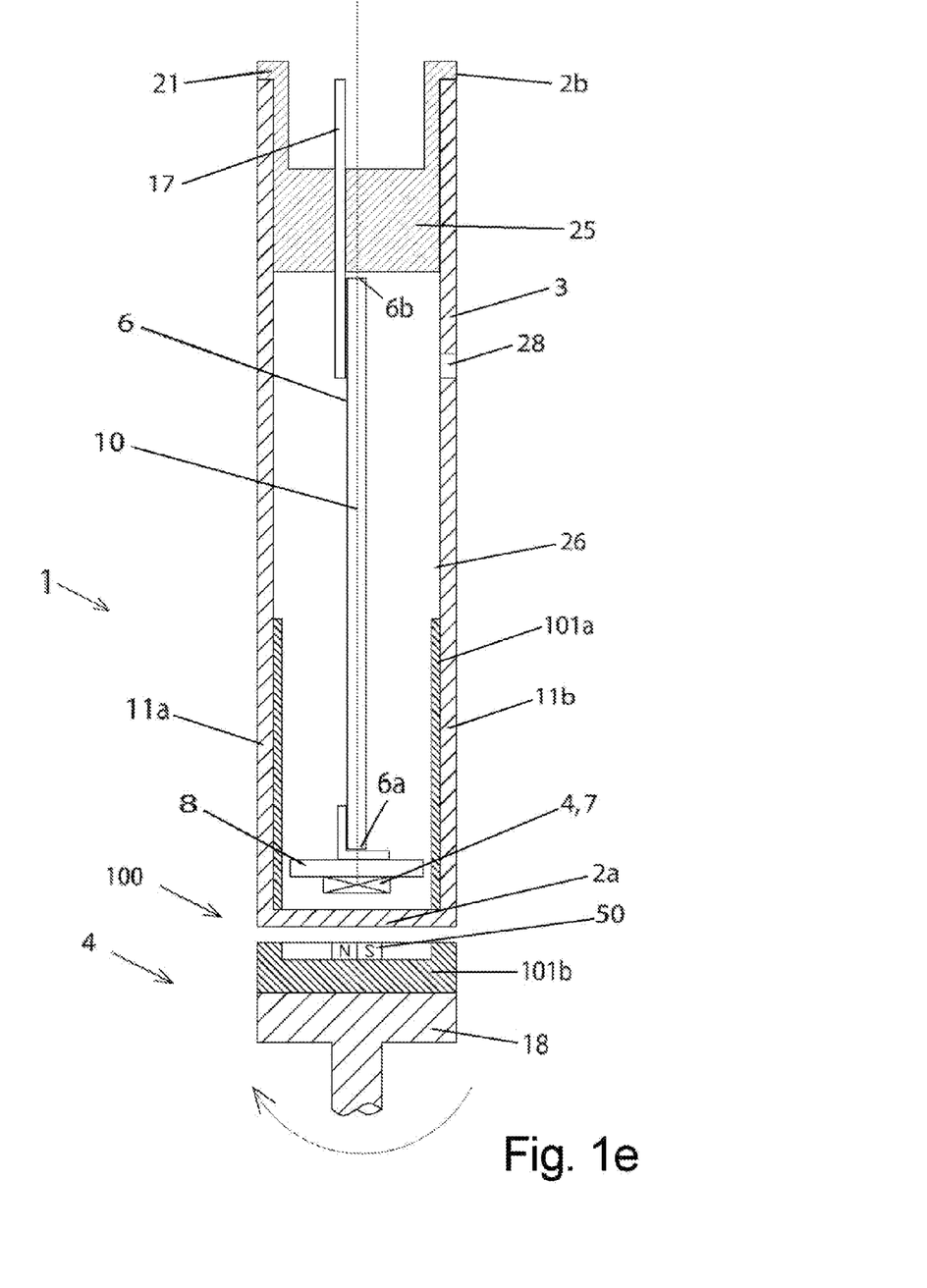

The solution of FIG. 1c differs from the solution in FIG. 1a in two points.

On the side of the angle sensor 1, the housing 3 is open at the forward face end so that the housing 3 has the shape of a sleeve. For this purpose, the sensor shielding 101a is not only provided as a sleeve, but pot shaped, so that the bottom of this pot-shaped shielding 101a closes the forward, otherwise open, front face of the housing 3, while the walls of the pot-shaped shielding 101a are inserted into the interior of the housing 3 and extend over the axial portion of the sensor 4.

On the side of the magnet unit 50, again the single encoder magnet 50, which is magnetized in transversal direction to the longitudinal axis 10, is placed onto a plate shaped encoder shielding 101b, and received together with it in the front side recess of a pot-shaped encoder core body 18, e.g. glued in, wherein the voids can be filled with encasement material again.

Figure 2A:
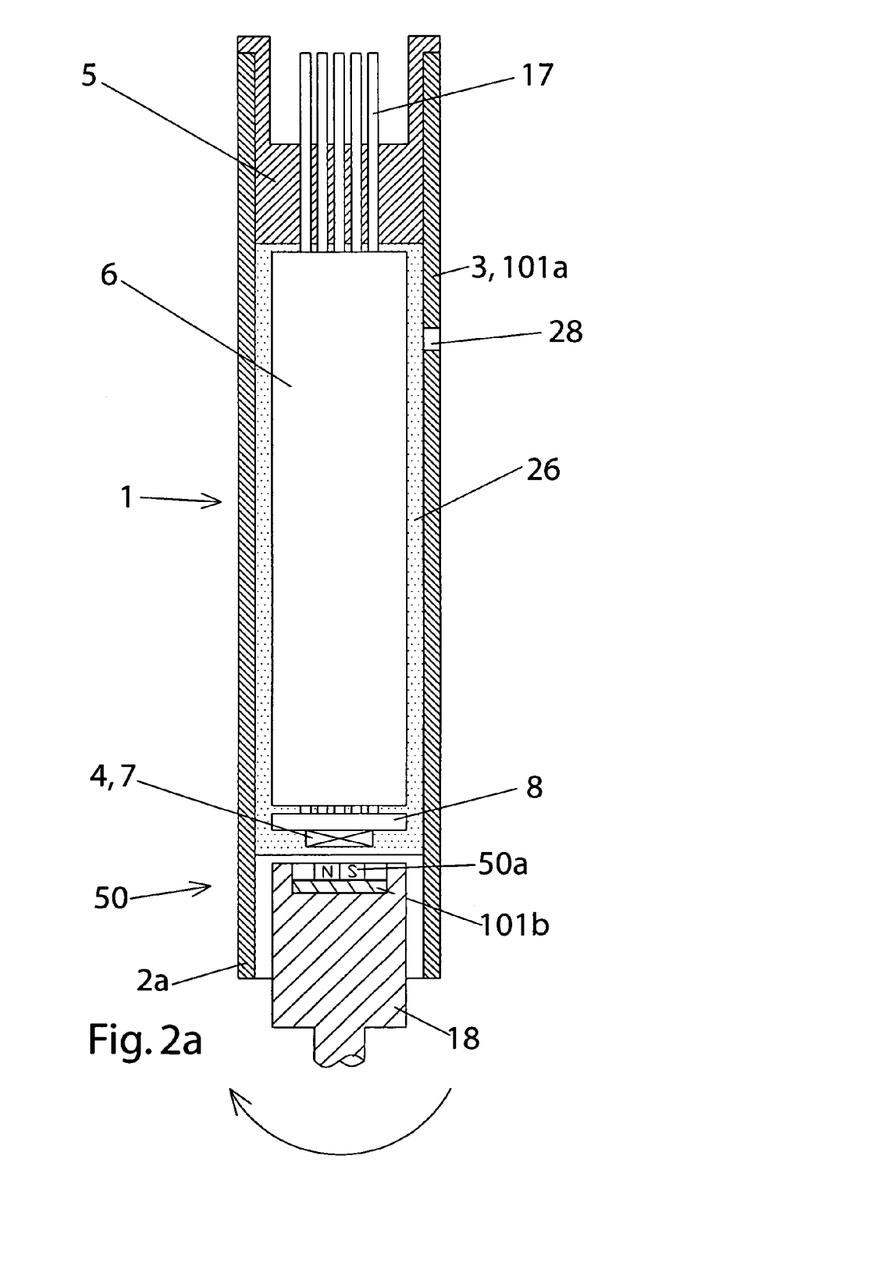
FIGS. 2a-2c, 3 illustrate longitudinal cuts through different embodiments of sensor units.

FIG. 2a shows a solution in which the sensor element 4 is further offset to the rear compared to the forward front face 2a of the housing 3 and otherwise encased like in the solution of FIG. 1b.

The additional rearward offset is being used for having the magnet unit 50 reach further into the interior of the housing 3, so that not only the encoder magnet 50a, here again a diametrically magnetized magnet 50a like in FIG. 1a, is disposed within the housing 3 but also its plate-shaped encoder shielding 101b is disposed on the backside of the magnet 50a in the recess of the pot or dish of the core body 18 of the magnet unit 50.

The sensor shielding 101a in this case is not comprised of a separate component provided as a sleeve inserted into the housing 3, but the housing 3 itself is made from a shielding material so that the two shieldings 101a, b overlap to a large extent in axial direction.

Figure 2B:
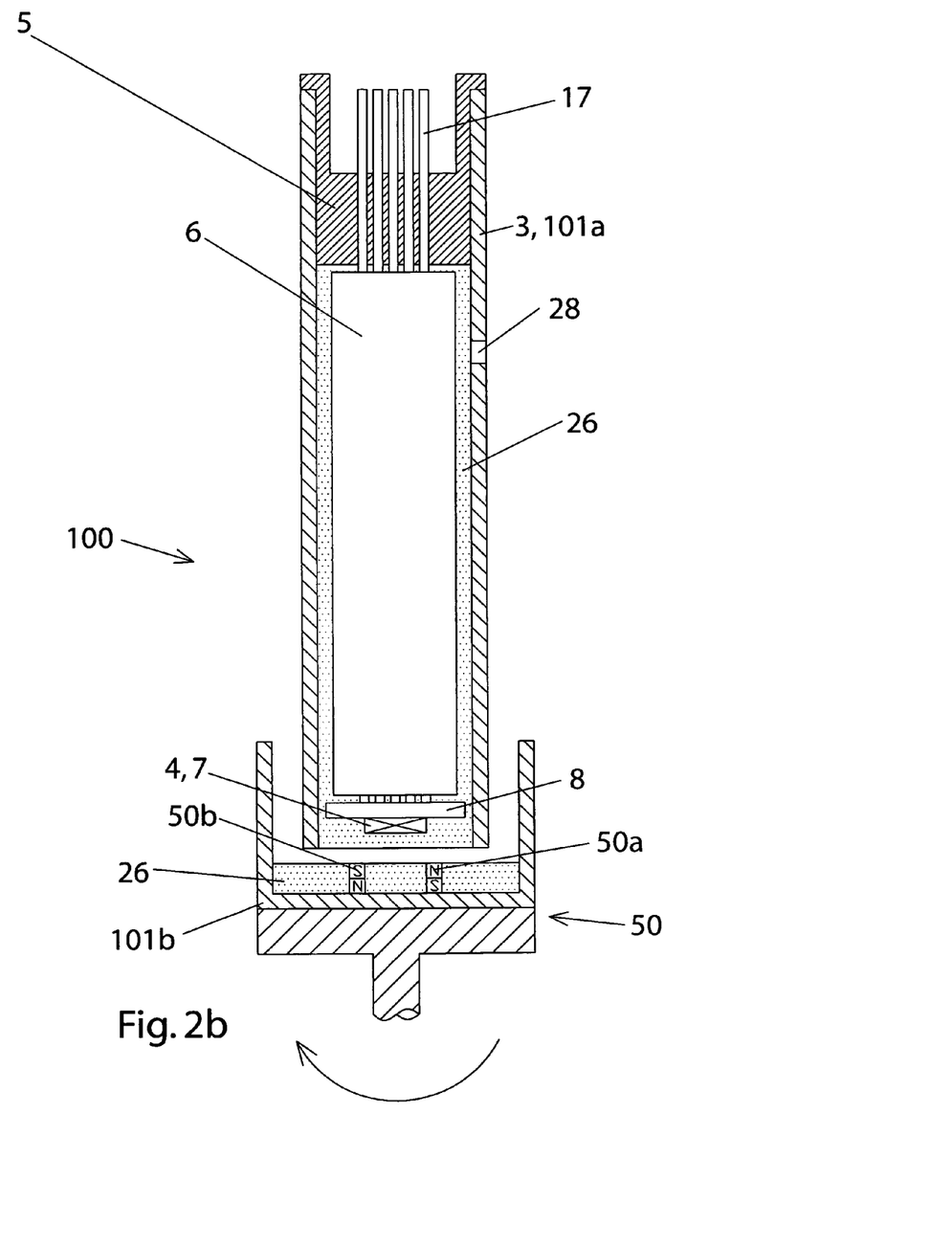

In order to accomplish an axial overlap of the shieldings of sensor and encoder, FIG. 2b shows the reverse path compared to FIG. 2a, by the pot shaped shielding 101b of the magnet unit reaching over the front end of the housing 2 of the sensor element on the outside like a cap, thus the entire angle sensor 1 reaching into the shielding 101b of the encoder with its front portion.

Accordingly, the sensor element 4 can reach up close to the forward face surface of the housing 3, and does not require a large rearward offset, in order to reach close to the encoder magnets 50a,b in this case two of them, positioned in front of the face surface of the housing 3 (in an assembly like in FIG. 1a).

Also in this case an encasement of the sensor element 1 in the housing 3 is advisable.

Figure 2C:
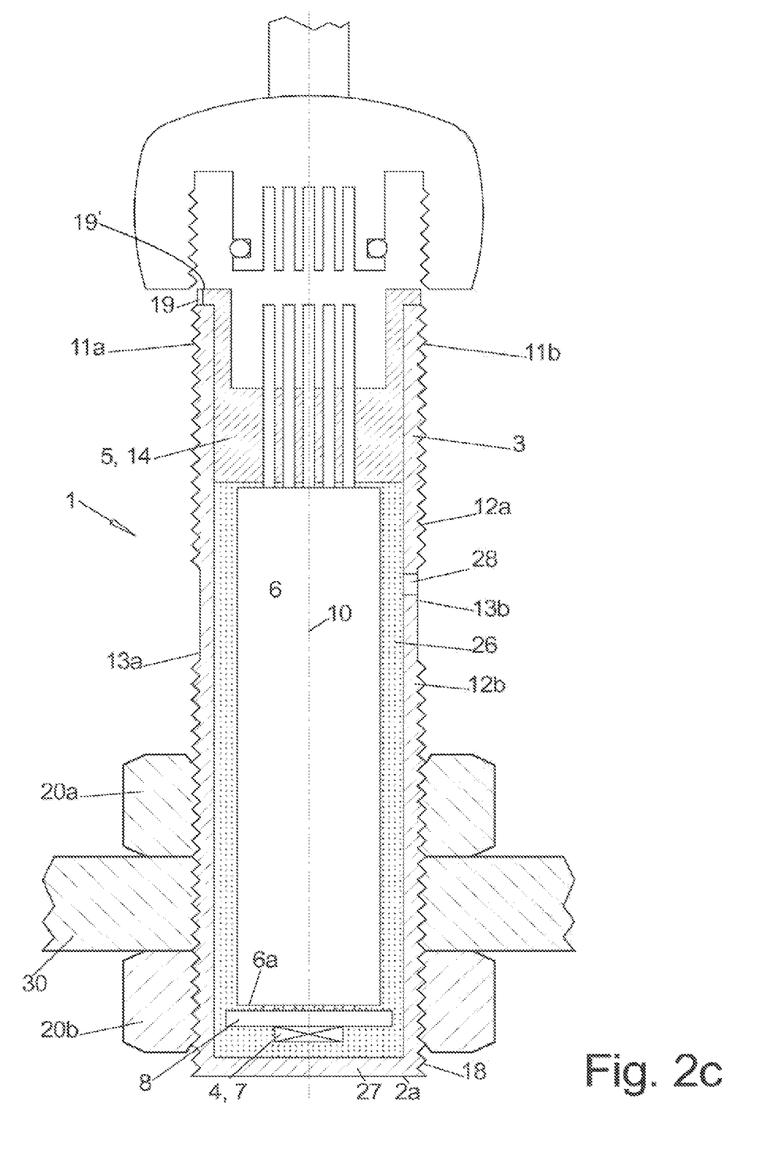

FIG. 2c shows the mounting of the angle sensor 1 to a component in the vicinity, in this case to a wall 30.

In this wall 30, a pass-through is manufactured which is large enough to pass the housing 3 of the angle sensor 1 through.

The outer circumference of the housing 3 is provided with an outer thread 12, which is interrupted in the center portion, and thereby divided into two threads 12a, b, while in the portion there between, a non-circular outer circumference with parallel and opposite two contact surfaces 13a, b can be provided in whose portion preferably also the bleed opening for the encasement operation is disposed.

Two nuts 20a, b are threaded onto the front portion of the exterior thread 12a which can clamp the wall 30 between them through threaded engagement, whereby the axial length of the housing 3 and thus of the angle sensor 1 and also its angular position relative to the component 30 can be adjusted and fixed.

The zero position of the functional components in the housing 3 is marked by a zero position marker 19 at the circumference of the functional components, preferably at the shoulder 21 of the connector socket 5. Otherwise, the embodiment of the angle sensor corresponds to the one in FIG. 1a.

Figure 3:
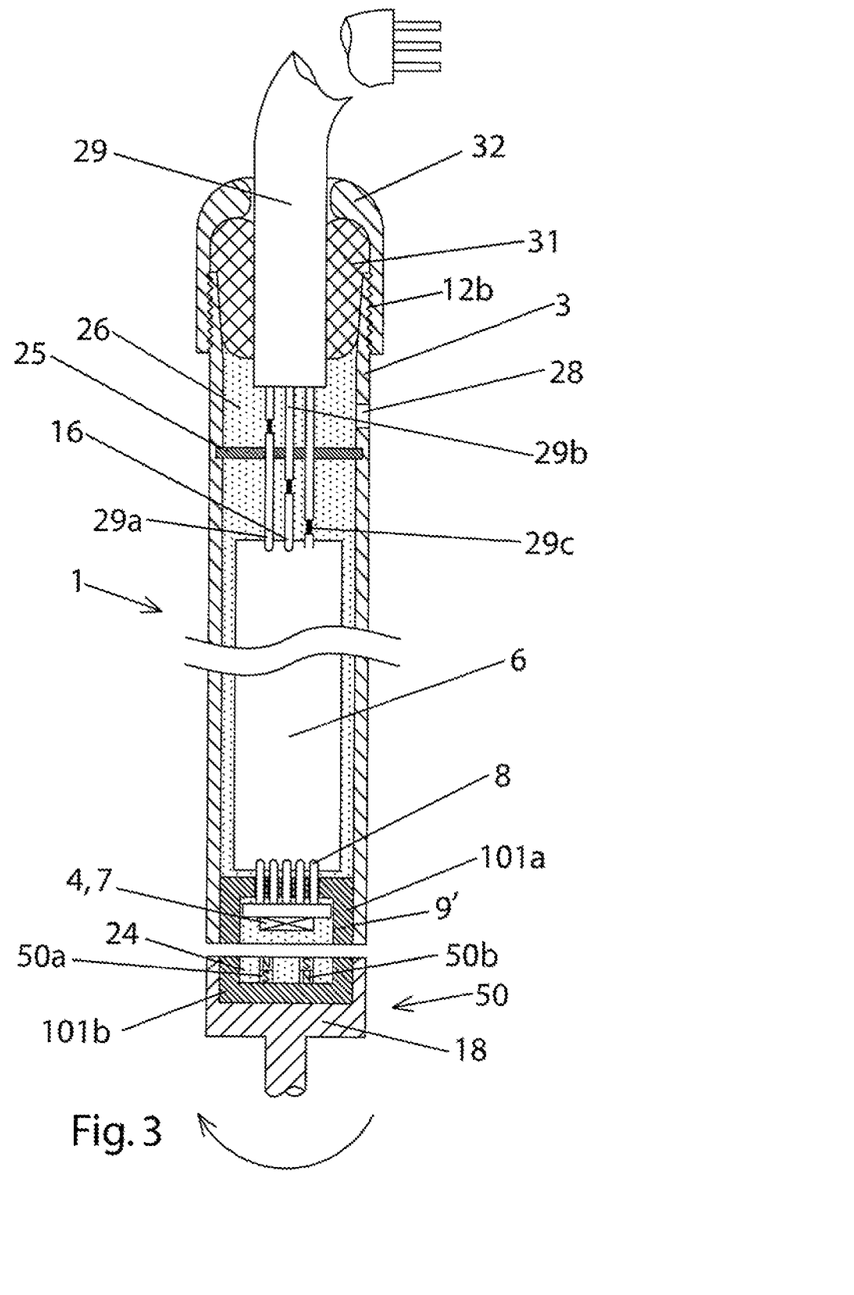

FIG. 3 shows a solution in which the encoder 51 corresponds to the one of FIG. 1a besides the fact, that two magnets 50a, b with axial pole direction as in FIG. 2b are disposed therein.

The most important difference is located on the side of the angle sensor 1, in which the transmission of the signals from the main circuit board 6 is not performed by means of a connector socket but by means of a fixed cable 29 through a seal grommet 31 and a screw cap 32, threaded over it, at the backend of the housing 3.

The screw cap 32 is thus again threaded onto the exterior thread 12 or 12b and thereby presses the seal grommet 31 against the exterior circumference of the cable 29.

In order to avoid a penetration of longitudinal water through the cable into the sensor, the particular strands 29a, b of the cable 29 are disposed at a distance relative to each other and cleared of their strand insulation at a respective location.

Either through the not yet positioned seal grommet or the vent opening 28, the interior of the housing 3 is filled with encasement material 26 so that all strand sections 29a, b, where the insulation has been removed, are encased and thus the end of the jacket insulation of the cable 29 from which the particular strands 29a, b protrude. Irrespective of the fact that longitudinal water presses ahead between the strand insulation and the jacket insulation, or between the strands within the strand insulation, it is sealed by the encasement material 26 which hardens subsequently.

Figure 4A:
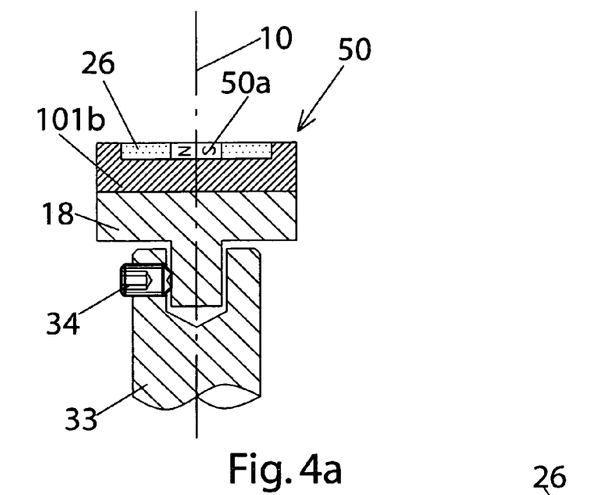
FIGS. 4a-c illustrate various embodiments of encoder elements.
Figure 4B:
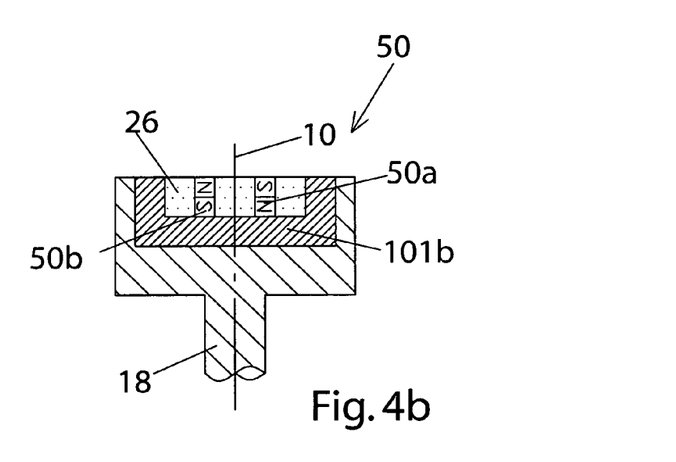
Figure 4C:
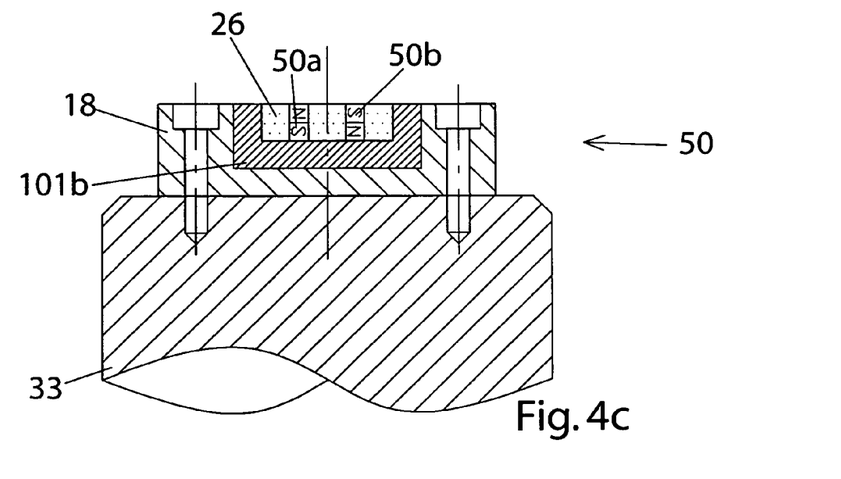

FIG. 4 shows different embodiments and mounting types of the magnet unit 50 at the component, typically a shaft 33 which is to be detected with respect to its rotation position.

In FIG. 4a and FIG. 4b, the core body 18 of the encoder is provided plate shaped with a central protrusion towards the rear which can be inserted into a corresponding blind hole of the shaft 33 and can be fixated therein by means of a set screw 34.

On the face surface of the core body 18, the pot-shaped shielding 101b of the encoder magnet 50a is disposed, which is located in the center of the pot-shaped recess of the shielding 101b, when it is a single magnet 50, which is magnetized diametrically relative to the longitudinal axis 10, as shown in FIG. 4a, or when there are two parallel magnets 50a, b, oriented in longitudinal direction 10, and opposed with respect to the rotation axis 10, as shown in FIG. 4b.

FIG. 4c shows a solution wherein this pot-shaped encoder shielding 101b is received in a core body 18 radially protruding beyond the encoder shielding 101b and which can be bolted to the face surface of a component 33 to be detected by means of axial bore holes disposed outside of the shielding.

In all cases, the encoder magnet(s) can also be encased in the recess of the pot shaped shielding 101b for protecting the magnet(s) 50, so that the encoder comprises a planar face surface pointing towards the sensor element.

Figure 5A:
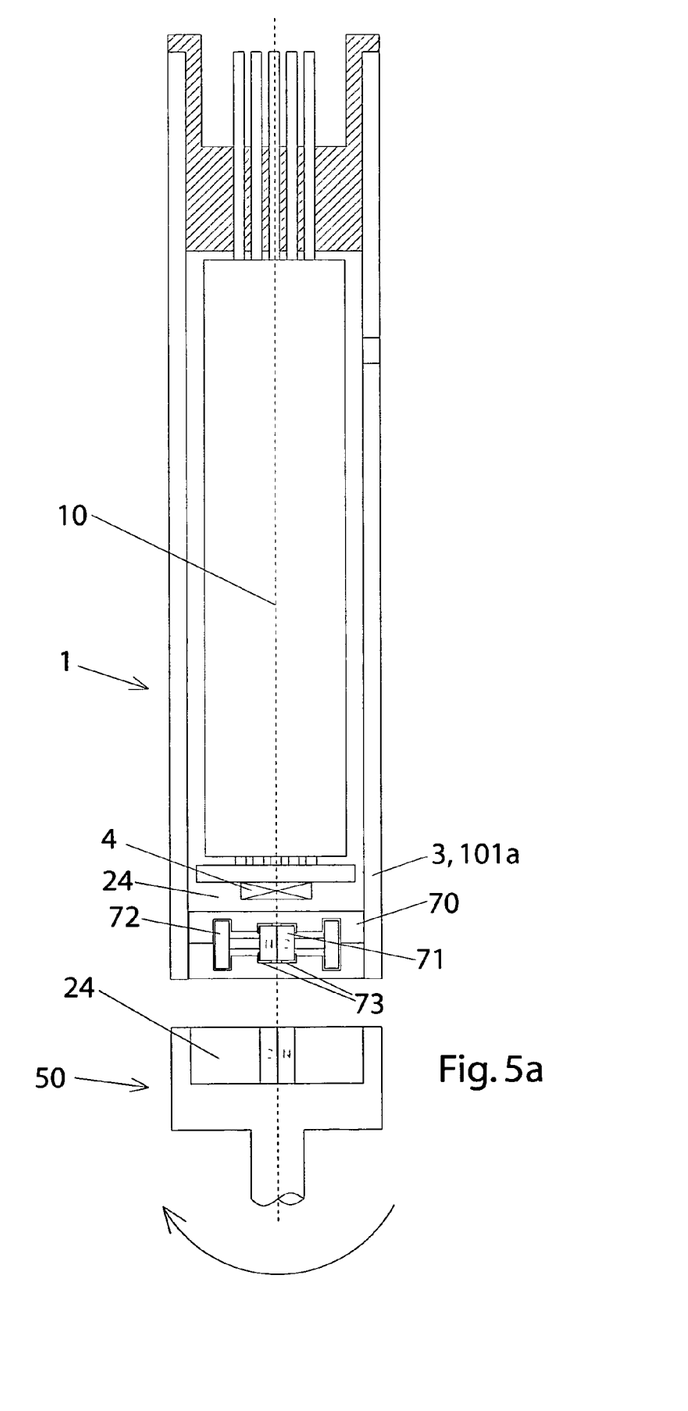
FIGS. 5a-b illustrate a particular front cover.
Figure 5B:
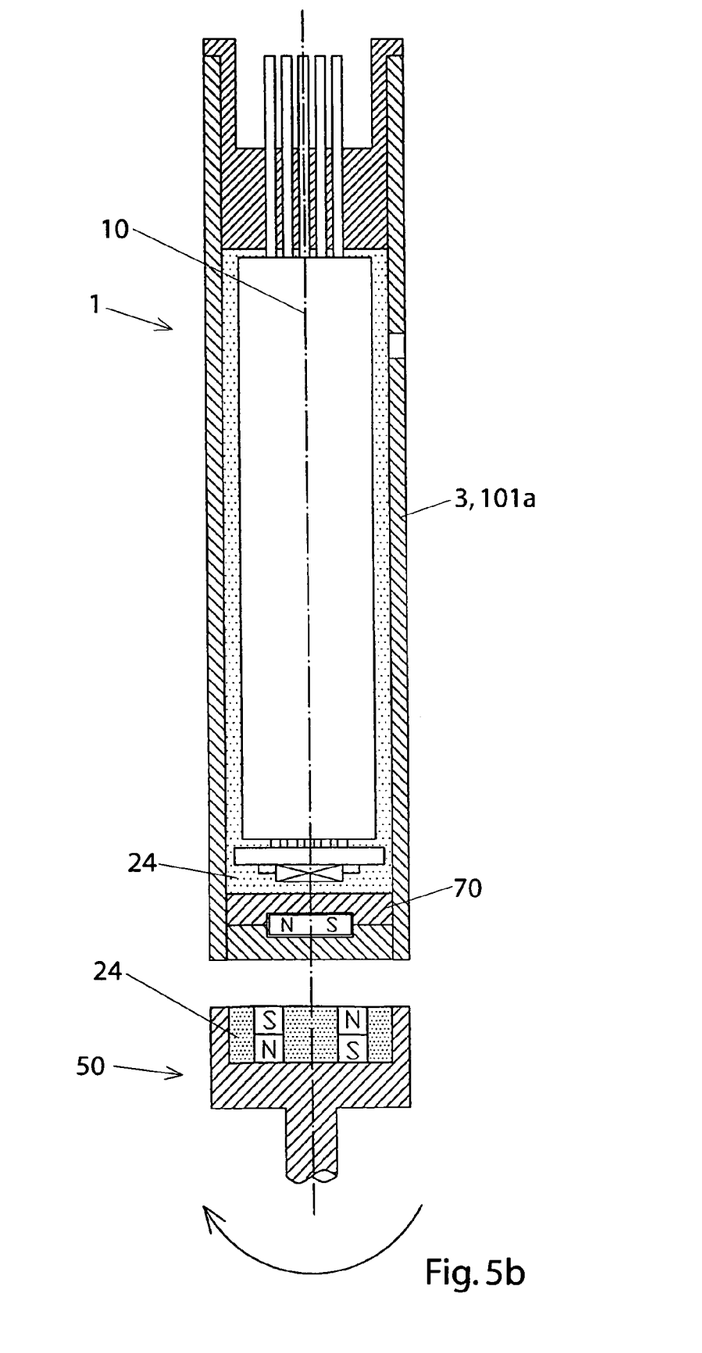
Figure 6:
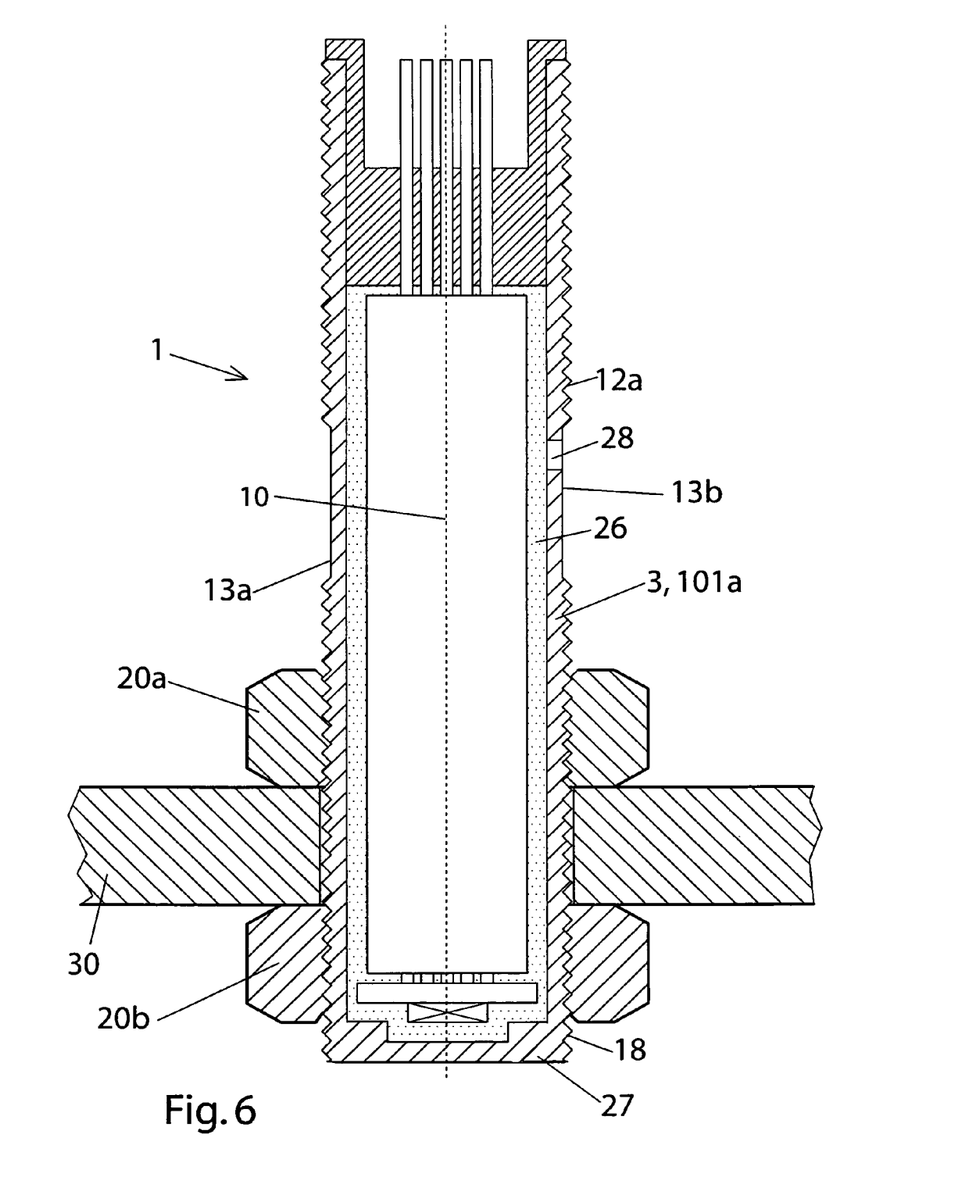
FIG. 6 illustrates an embodiment with intermediary unit.

The FIGS. 5 and 6 show additional possibilities in order to improve the measurement precision of the sensor unit 100.

Thus FIG. 5 shows a sensor unit 100 corresponding to the one of FIG. 3a besides the fact that an additional intermediary unit 70 is provided in FIG. 5 in angle sensor 1.

The intermediary unit 70 is a disk-shaped body which is included in housing 3 of angle sensor 1, and preferably also disposed within its shielding 101a, and thus before the sensor element 4, so that it is disposed between the sensor element 4 and the magnet unit 50.

The exterior circumference of the intermediary unit 70 can be sized corresponding to the inner circumference of the sensor shielding 101a, and/or the intermediary unit 70 can be mounted to the backside of a front cover which can be provided as an overreaching cover.

In the intermediary unit 70, an intermediary magnet 71 is supported with its pole axis in the direction of the main axis of the disk shaped intermediary unit 70 and, thus, perpendicular to the longitudinal axis 10 of the angle sensor 1 on this longitudinal axis rotatable in the intermediary unit 70.

In order to effectuate a support which has little friction as possible, the intermediary magnet 71 is supported in the intermediary unit 70 by means of a ferro fluid forming a lubricant and the support, and at which the magnet 71 adheres due to very fine iron particles which are dissolved in the lubricating fluid.

Thus, the lubricant always stays in the support gap. Running the support location dry is avoided without further additional measures.

The magnetic field lines of the indicator magnet thus impact the intermediary magnet 71, and rotate with it, and its field lines initially impact the sensor element 4.

The advantage is that the intermediary magnet 71 is always in the same defined and correct axial position with respect to the sensor element 1.

An axial or radial offset of the encoder magnet(s) 50*a, b* relative to the longitudinal axis 10 still causes a synchronous engagement of the intermediary magnet 71 and, thus, initiates a correct measurement at the sensor element 4, which in case of a direct impact of badly placed encoder magnets 50*a, b* relative to the sensor element 4, which would be performed substantially worse under a direct impact.

Furthermore, an annular shielding 72 is visible in the intermediary unit 70, which is received in the intermediary unit 70, surrounding the intermediary magnet 71 in an annular manner, as a radial sleeve with an offset in order to prevent impacts of magnetic fields interfering from the side.

On the face side, on the one hand, towards the encoder magnet 50 and, on the other hand, towards the sensor element 4, no shielding of the encoder magnet 71 is provided.

The solution of FIG. 5*b* differs from the one according to FIG. 5*a*, on the one hand, on the side of the magnet unit 50 by two axially magnetized encoder magnets 50*a, b* being provided symmetrical to the longitudinal axis 10.

The difference on the side of the angle sensor 1 is that the intermediary magnet 71 is disposed with its magnetic axis transversal to the longitudinal axis 10, like in FIG. 5*a*, and rotatably supported in the intermediary unit 70, in particular, by means of a ferro fluid 73. However, around this intermediary magnet 71 no separate magnetic shielding is provided, but it is provided by means of the sleeve shaped magnetically shield housing 3.

The solution according to FIG. 6 intends to achieve the same object and differs from the one of FIG. 1*a* only by means of the configuration of the sensor shielding 101*a*, here in the form of the front cover 27.

The front cover is made of magnetically conductive material, e.g. soft magnetic materials, in particular iron, which is paradox at first glance, since thereby a shielding effect relative to the encoder unit 50 occurs which is supposed to impact the sensor element 4.

This actually occurs in the radially exterior portions of the front cover 27 which has a large wall thickness.

In the center area around the longitudinal axis 10, where also the sensor 4 is located, the material thickness of the shielding 101*a*, thus of the front cover 27, shielding as a matter of principle is reduced so far that the magnetic force of the magnet unit 50 suffices to not only magnetically saturate this minor wall thickness but additionally to permeate it with magnetic field lines up to the sensor element 4.

Thus, the advantageous effect is that in case of a not correctly aligned encoder unit 50, as illustrated in FIG. 5, in case of a eccentrically slightly offset magnet unit 50, the field lines originating at the encoder magnet(s) are centered through the portion of the reduced wall thickness and its center. This means the sensor element 4 and, thus, the measuring result is degraded less through the incorrect spatial alignment of the encoder magnet unit 50 relative to the angle sensor 1 than without such configuration of the sensor shielding 101*a*.

The invention claimed is:

1. A pin-shaped angle sensor (1), detecting a magnetic field from a rotating encoder magnet (50) around its longitudinal axis (10), said sensor comprising:
    a magnetically sensitive face surface portion, operating according to the Hall-principle, or according to the magnetoresistive principle, having a sensor element (4) proximal to its face surface (2*a*) wherein said magnetically sensitive face portion is opposed to a rotating encoder magnet;
    a cylindrical housing (3) having an exterior of the housing, having at least a portion of said exterior threaded, and having a zero position marker (19) in the form of a zero position groove (19') on said exterior at one of its longitudinal sides (11*a, b*);
    a main circuit board (6) disposed in a direction of a longitudinal axis (10), and said sensor element (4) being mounted at a short or narrow side (6*a, b*) of the main circuit board (6), transverse to said main circuit board;
    wherein said sensor element (4) is a chip (7) mounted on a sensor circuit board (8) positioned transversal to said main circuit board;
    a front cover (27) composed of non-ferromagnetic metal on said cylindrical housing;
    a pilot plug (14) composed of translucent plastic; and
    said pilot plug (14) being a connector socket (5) having electrical contacts, which connector socket is formed of an electrically non-conductive plastic material, which connector socket fits within said housing (3), with an exterior thread (12*a, b*) for screwing a connector with a sleeve nut sealed by means of an O-ring relative to an inner circumference of the housing.

2. The angle sensor according to claim 1 wherein said sensor circuit board (8) is disposed in a circular inner contoured receptacle of the housing (3) in a concentric exactly fitting manner.

3. The angle sensor according to claim 1 wherein said housing (3) is composed of materials selected from the group consisting of: ferromagnetic material and steel.

4. The angle sensor according to claim 1 wherein said housing (3) has open face surfaces (2*a, b*).

5. The angle sensor according to claim 1 wherein said housing (3) has a cross section (9) which remains constant over its length.

6. The angle sensor according to claim 1 wherein said pilot plug (14) is provided as said connector socket (5) includes said electrical contacts accessible from the outside.

7. The angle sensor according to claim 1 wherein at the rear end of said main circuit hoard (6), soldering connector elements (16) are disposed for soldering together with plug pins (17).

8. The angle sensor according to claim 1 wherein said pilot plug (14) provided as said connector socket (5) has an expanded shoulder (21) for applying to rear face surface (2*a,b*) of the housing (3).

9. The angle sensor according to claim 1 wherein said sensor element (4) detects an amount or a change of a magnetic flux.

10. The angle sensor according to claim 1 further wherein said front cover (27) is pressed into an encasement material when it is still soft.

* * * * *